United States Patent [19]

Wenninger, deceased

[11] E Re. 28,659

[45] Reissued Dec. 23, 1975

[54] SAND-MULLING APPARATUS

[75] Inventor: Clifford E. Wenninger, deceased, late of Berwyn, Ill.

[73] Assignee: Pettibone Corporation, Chicago, Ill.

[22] Filed: May 17, 1974

[21] Appl. No.: 470,751

Related U.S. Patent Documents

Reissue of:

[64] Patent No.: 3,602,442
Issued: Aug. 31, 1971
Appl. No.: 19,445
Filed: Mar. 13, 1970

U.S. Applications:

[63] Continuation of Ser. No. 684,192, Nov. 20, 1967, abandoned.

[52] U.S. Cl. ..... 241/110; 241/124

[51] Int. Cl. ..... B02c 15/00; B02c 23/00

[58] Field of Search ..... 241/105, 108, 110, 112, 241/123, 118, 124, 129, 162, 166, 601, DIG. 10; 259/107, 108, 178 A, DIG. 4

[56] References Cited

UNITED STATES PATENTS 2,303,319 12/1942 Beardsley ..... 241/129 X 3,256,573 6/1966 Hunter ..... 241/110 Z

OTHER PUBLICATIONS

Beardsley & Piper, Speedmullors, April 1966, Bulletin No. 466.

*Primary Examiner*—Al Lawrence Smith
*Assistant Examiner*—Gary L. Smith
*Attorney, Agent, or Firm*—Norman H. Gerlach

[57] ABSTRACT

A foundry-sand-mulling apparatus having a cylindrical mulling bowl within which there is provided a novel form of sand-elevating plow construction having three functional components, namely, a main lift plow in the form of a sand scoop pan, a side wing which prevents sand from spilling over the inner side edge of the main lift plow and also compresses the sand against the sidewall of the bowl during travel of the plow consturction in a circumferential direction in the bowl and a side plow which directs sand onto the main lift plow.

7 Claims, 6 Drawing Figures

SAND-MULLING APPARATUS

Matter enclosed in heavy brackets [ ] appears in the original patent but forms no part of this reissue specification; matter printed in italics indicates the additions made by reissue.

The present [invention] *application* is a continuation of my pending U.S. Pat. application Ser. No. 684,192, filed on Nov. 20, 1967, now abandoned and entitled "SAND MULLING APPARATUS."

The present invention relates to an apparatus for mulling or conditioning foundry sand of the type which is used in connection with metal-casting operations.

It has long been the practice after a casting operation to remove the packed and heated sand from the flasks and then, in order to condition the sand for reuse in the flasks in connection with a future casting operation, to mull the sand by placing it, together with any suitable bonding material such, for example, as clay, in a large-sized cup-shaped receptacle or bowl and then subjecting it to the action of rotary mulling elements and, in addition, [deflectorlike] *deflector-like* plows which successively elevate the portion of the sand into the circular path of travel of the mulling elements. The mulling operation serves to break up any lumps in the sand *and* also serves to aerate and resultantly to cool the sand and, in addition, to mix the bonding material intimately with the sand. During the mulling operation, water is usually added to the sand in order to moisten it, thus increasing the bonding strength of the sand when it is ultimately used in a casting operation.

It is obvious, therefore, that the efficiency of any sand-mulling apparatus is largely dependent upon the ability of the apparatus to effect intimate mixing of the sand, the bonding agent, and the water in the proper amounts and in a batch cycle of minimum duration. A batch cycle may be said to be complete when each grain of sand becomes completely coated with a skin of the bonding agent and the thus coated sand grains have adhered thereto the proper amount of moisture with little or no excess of free bonding agent or water remaining within the mulling chamber which is constituted by the interior of the cup-shaped bowl of the mulling apparatus. The attainment of this condition in the shortest possible period of mulling time is the aim of all present-day mulling apparatus.

The type of sand mulling which is performed by a mulling apparatus of the character briefly outlined above is commonly referred to as pressure extrusion mulling by reason of the fact that the apparatus invariably employs as the rotary mulling elements heavy, horizontally extending, mulling wheels which exert great pressure upon the sand undergoing mulling by squeezing it against the cylindrical sidewall of the bowl, thus inducing a shearing action of the sand particles against one another as well as against said cylindrical sidewall. Such shearing action is extremely effective in intimately mixing particles of clay or other bonding material with increments of moisture. With the depletion of many natural sand deposits of high clay content and the consequent replacement by foundries of natural sand with synthetic mixtures having a low clay content, greater pressures have been employed in the belief that a granule-to-granule shearing action under high pressure will enhance the desired sand grain coating.

The present mulling apparatus is predicated upon entirely different theoretical considerations. During mulling, sand grains respond to mechanical force by striving to unite or gather together in such a manner as to offer greater resistance to the application of mulling force by the mulling wheels. A transformation of sand grains into clusters commences as soon as water is added by introducing it into the receptacle bowl of the mulling apparatus. Subsequently, when clay is added, clay balls are formed and resultant sand and clay clusters appreciably restrict the ability of pressure by the mulling wheels to effect the desired extrusion. For an individual grain to acquire a more complete coating, it must be separated from a cluster so that the otherwise protected surfaces thereof may receive additional bond and also surrender excess bond to other grains, thus accelerating complete bonding of all of the sand particles. Since clusters are inevitable with any type of foundry sand mulling, these clusters must be broken up as soon as they tend to form and the present invention affords a novel means in the form of specially designed plow constructions which operate entirely independently of any associated rotary mulling wheels to maintain an unrestricted assembly and subsequent breakup of clusters so that uniform coating of the sand grains will be attained in a minimum of mulling time. The provision of a foundry-sand-mulling apparatus employing such plow constructions constitutes the principal object of the present invention.

In carrying out this particular object, the invention contemplates the provision of a sand-mulling apparatus which, in the main, is structurally similar to a horizontal mulling wheel apparatus in that it is provided with a generally cylindrical, cup-shaped mulling receptacle or bowl within which there is mounted for rotation about a vertical axis the usual horizontally extending hub which carries the aforementioned novel plows and may also, but not necessarily, carry a set of horizontally extending, rotatably mounted, mulling wheels. The general arrangement may be similar to that which is shown and described in U.S. Pat. No. 3,256,573, granted on June 21, 1966 and entitled "SAND MULLING APPARATUS." The mulling bowl, the rotatable hub or crosshead, the drive mechanism for the hub or crosshead, the door-closed opening for unloading the mulled sand from the bowl, and the mulling wheels (if employed) may be substantially the same as the equivalent components or structures of the mulling apparatus of said patent, the principal difference residing the configuration of the novel plow constructions which differ both in structure and function from those of the mulling apparatus of the patent. The present sand-mulling apparatus is, therefore, capable of being manufactured as an original apparatus or, alternatively, it may be constructed by suitable modification of an existing mulling apparatus. In either event, the essential features of the invention are preserved.

Other objects of the invention and the various advantages and characteristics of the present mulling apparatus will be apparent from a consideration of the following detailed description.

In the accompanying two sheets of drawings forming a part of this specification, several illustrative embodiments of the invention are shown.

Figure 1:
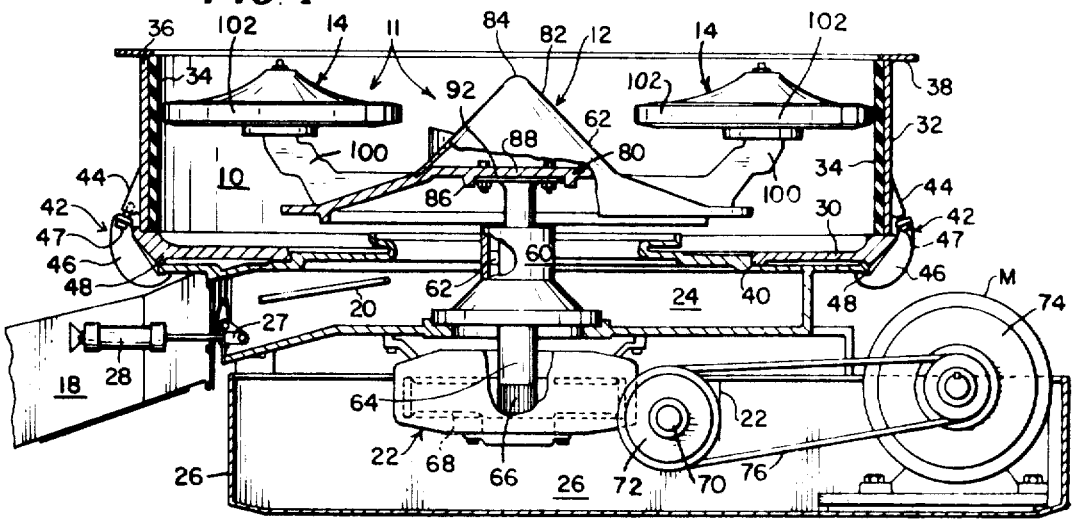
FIG. 1 is a sectional view taken substantially centrally d vertically through a mulling apparatus employing a eferred form of plow construction embodying the inciples of the present invention, certain parts being oken away and other parts being shown in elevation order more clearly to reveal the nature of the inven-n.
Figure 2:
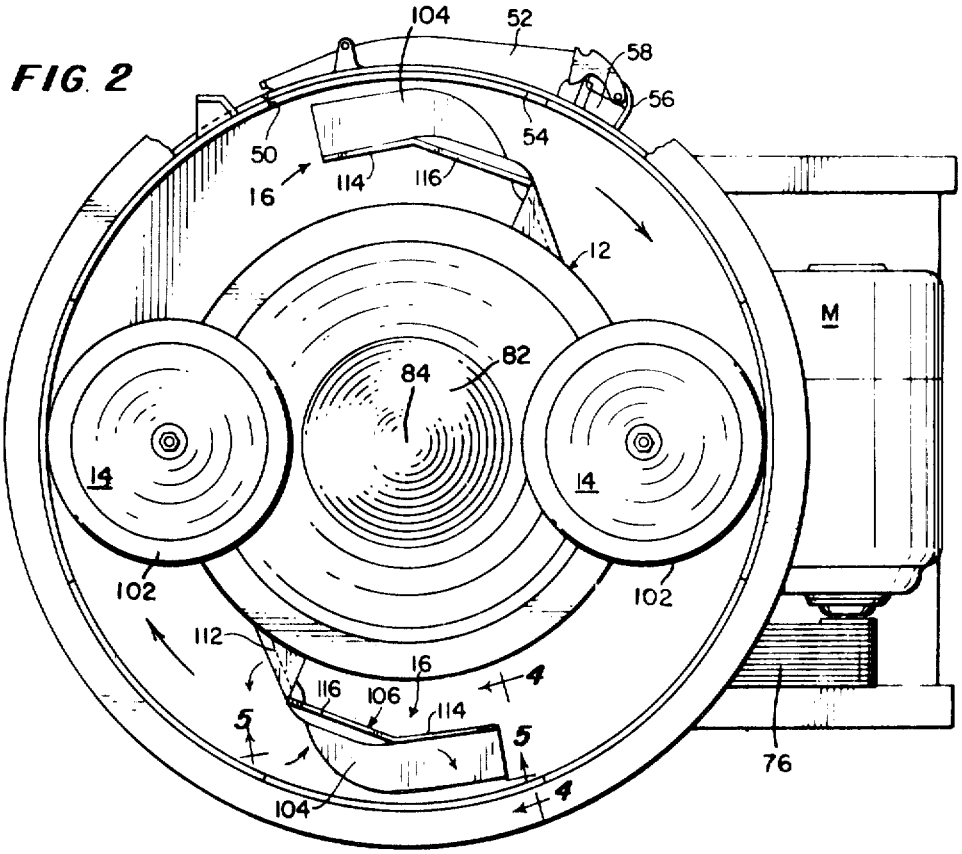
FIG. 2 is a top plan view of the improved mulling paratus of FIG. 1.

Referring now to the drawings in detail and in partic-ar to FIGS. 1 and 2, the apparatus which is shown erein constitutes one exemplary form of the inven-n although not necessarily the commercial embodi-ent thereof. The apparatus is particularly designed d adapted for use in a foundry or similar establish-ent and serves as a means or instrumentality for mull-g and conditioning molding sand preparatory to use the sand in flasks during a casting operation. Briefly, e apparatus involves in its general oganization a mull-g bowl 10 within which there is centrally disposed a tatable unitary sand-mulling assembly 11. The latter mprises a central, horizontally extending hub 12, ch hub being mounted for rotation about a vertical is and serving to carry a series of two mulling ele-ents in the form of horizontally disposed wheels 14, d, in addition, a series of two deflector-like plow nstructions 16, the latter being secured to the periph-y of the hub and constituting the principal feature or int of novelty of the present invention. Although two the mulling wheels and two of the plow constructions e illustrated in the drawings herein for exemplary or sclosure purposes, it is to be distinctly understood at a greater number of such wheels and plow con-uctions may be employed if desired. Insofar as the ulling wheels 14 are concerned, they are not essential the present invention and may be omitted entirely if sired. However, under certain circumstances, the heels augment the action of the plow constructions 16 a beneficial manner and, as a conseuqence, they ve been included herein as a part of the overal disclo-re. Regardless the wheels augment the action of the ow constructions 16 in a beneficial manner and, as a nsequence, they have been included herein as a part the overall disclosure. Regardless of the number of heels and plow constructions which may be employed any given installation, the circumferential spacing ereof will always be equal so that in the illustrated rm of the invention, the wheels are disposed 180° part on the periphery of the hub 12 and the plow nstructions are likewise disposed 180° apart but are sitioned midway between the two mulling wheels.

The mulling wheels 14 are rotatably mounted on the ripheral portion of the hub 12 and thus are bodily volvable about the vertical axis of the hub as well as ing rotatable about their own individual vertical es. The plow constructions 16 are fixedly secured to the peripheral portion of the hub in a manner to be described hereafter.

The foundry-sand-mulling apparatus further includes an air supply duct 18 for introduction of air under pressure to the interior of the bowl 10 for sand aeration and cooling purposes, a water supply pipe 20 for introducing water into the bowl for admixture with the sand, and an electric motor M. The latter is operatively connected through the medium of a gear reduction device 22 to the aforementioned rotary sand-mulling asssembly 11 and serves when energized to drive the same. The apparatus is essentially of the batch type and is adapted to mull and condition successive batches of new or previously used molding sand. The batches of sand may be periodically introduced into the bowl 10 through the open upper rim thereof by way of an endless conveyor or other means (not shown). The bowl is removably supported upon a hollow base casting 24 which, in turn, is mounted on a horizontally elongated main supporting frame 26. A pivoted damper 27 in the air duct 18 serves to control the flow of air under pressure into the interior of the bowl 10 via the base casting 24 and is operable under the control of an air cylinder 28.

Still referring to FIGS. 1 and 2, the bowl 10 is of a composite nature and comprises a substantially flat annular bottom wall 30 and an upstanding rubber-lined cylindrical sidewall 32, the inner 34 for which is of arcuate sectional design. The bowl sidewall presents a circular upper rim 36 which is provided with a narrow continuous, outwardly extending rim flange 38. The bottom wall 30 has formed therein a central opening 40 in communication with the interior of the base casting 24 in order to permit air under pressure from the air duct 18 to enter the bowl interior. The bowl 10 is removably clamped to the base casting 24 by means of an annular series of spaced-apart clamp assemblies 42, each of which embodies a clamp lug 44 which is welded to the bowl sidewall 32 at a point adjacent to the bottom rim thereof. Each clamp assembly 42 also embodies a hooklike clamping arm 46 and, in addition, a capscrew 47 which projects through the clamping arm and is threadedly received in the associated clamp lug 44. The clamping arms of the clamp assemblies 42 are adapted to hook beneath a circular depending marginal rib 48 on the base casting 24 so that when the capscrews 47 are tightened, the adjacent portion of the bowl will be drawn downwardly hard against the base casting on which it securely seats.

A discharge opening 50 interrupts the sidewall 32 of the bowl 10 throughout an arc of limited extent and this opening 50 is normally adapted to be closed by a hinged arcuate door 52 having associated therewith a rubber liner 54 which constitutes a continuation of the sidewall liner 34 when the door is in its closed position. The door 52 is hinged on a support 56 and is movable between open and closed positions with respect to the discharge opening 50 under the control of an air cylinder 58. The door structure and the control mechanism therefor constitute no part of the present invention and, therefore, the details thereof are not fully disclosed herein. For a more detailed understanding of this door structure, reference may be had to aformentioned U.S. Pat. No. 3,256,573. The novelty of the present invention resides rather in the nature of the rotatable sand-mulling assembly 11 and particularly in the nature and character of the plow constructions 16 which are associated with the assembly and will be described in detail presently.

The rotary sand-mulling assemby 11 which, as previously stated, embodies the hub 12, the mulling wheels 14 and the plows 16, is rotatably mounted on a vertically extending pedestal 60 which is fixedly connected to and extends upwards from the base casting 24 and has suitably mounted thereon one or more roller bearings 62. A vertical shaft 64 is journaled in the roller bearing or bearings 62 and is arranged so that the upper end thereof projects upwards beyond the pedestal 60 and is drivingly attached to the central portion of the hub 12. The lower end of the shaft 64 is provided with a splined section 66 which carries a gear 68, the latter constituting the output gear of the gear reduction device 22. The input shaft 70 of the gear reduction device carries a driven pulley 72. A cooperating driving pulley 74 which is associated with and driven by the motor M is connected to the pulley 72 by an endless belt 76, thus completing a power drive from the motor M to the rotatable sand-mulling assembly 11.

Referring now to the drawings the hub 12 of the rotary sand-mulling assembly 11 may assume various shapes but preferably is generally of the same configuration as the hub of the sand-mulling apparatus which is shown and described in aforementioned U.S. Pat. No. 3,256,573, such a hub lending itself admirably to use in connection with the present invention. The hub 12 is of a composite nature and includes an annular, horizontally extending casting 80 having the general shape characteristics of a truncated convex paraboloid of revolution of the type wherein a parabolic arc is revolved about an axis normal to the axis of the parabola and tangent to the parabola at its axis. The truncated upper portion of the casting 80 is surmounted by a sheet metal cone 82, the apex part of which is rounded as at 84. The hub 12 as a whole thus takes on a mushroomlike appearance when considered in connection with the pedestal 60 on which it is mounted. The entire upper surface of the hub 12 including the paraboloid-shaped casting 80 and the cone 82 is polished to a high degree of smoothness to reduce the coefficient of friction between the hub and the sand within the bowl 10 and thus reduce to a minimum any tendency for the sand to cling to the upper surface of the hub. The partly paraboloidal and partly conical contour of the upper surface of the hub 12 is so designed that the angle of repose of sand particles on any given point thereof will approach a zero angle when the hub is set into motion at normal operating speeds.

The details of the aforementioned driving connection between the upper end of the shaft 64 and the hub 12 have not been fully disclosed herein since they are not directly or necessarily applicable to the present invention and numerous forms of driving connections may be employed if desired. However, in FIG. 3, the casting 80 is shown as being formed with a central downwardly projecting annular pilot boss 86 which is formed as a part of a mounting web 88, the latter being provided with holes 90 (see FIG. 3) for bolts (not shown) by means of which the hub as a whole may be attached to a mating radially extending flange 92 (see FIG. 1) on the upper end of the shaft 64.

Referring now to FIGS. 2 to 6, inclusive, the two horizontally disposed mulling wheels 14 are of conventional or standard construction and each is rotatably mounted for individual rotation on the upper end of a supporting arm 100 of tapered design. The arms 100 are formed as integral parts of the hub near the periphery thereof and are inclined upwardly and outwardly. They are of streamline design which is to say that they merge gradually with the parabolic contour of the upper surface of the hub 12. The upper surfaces of the wheels are preferably in the form of paraboloids. The periphery of each wheel 14 is provided with a solid rubber or other elastomeric tire 102 as is customary in connection with a mulling apparatus of the general type under consideration and such tire is designed for cooperation with the elastomeric liners 34 and 54 of the bowl 10 and the discharge door 52 respectively in effecting the desired mulling action on the sand within the bowl interior.

Figure 3:
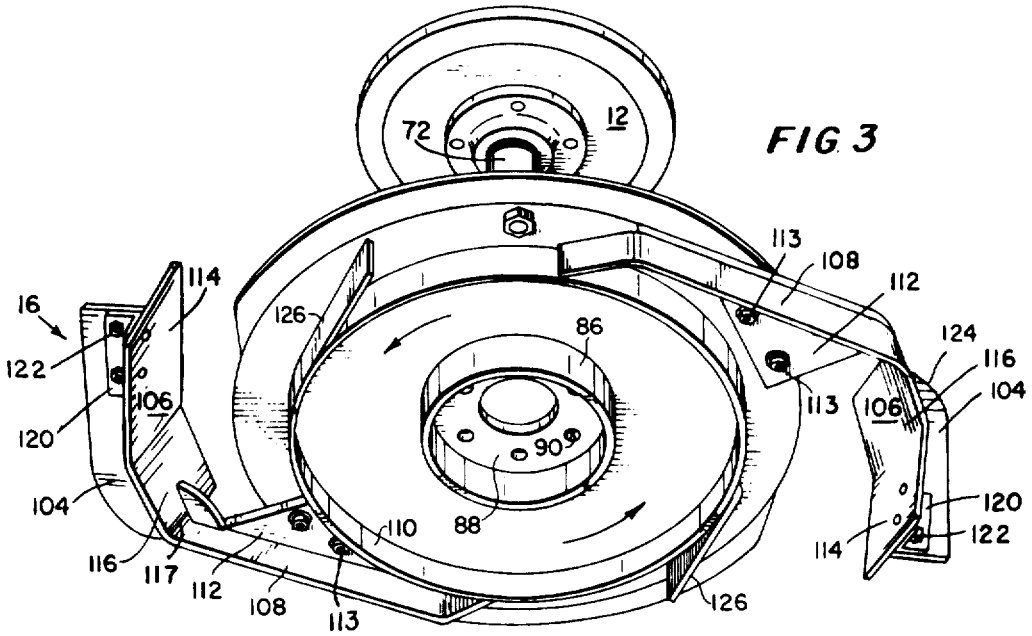
FIG. 3 is an underneath or bottom perspective view the rotatable hub, such view illustrating specifically e manner in which the various novel plow construc-ns are attached to the hub.
Figure 4:
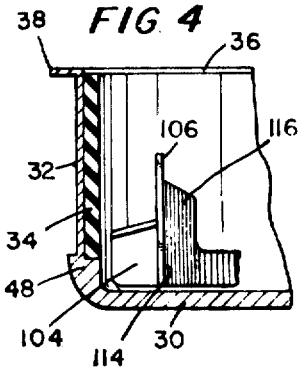
FIG. 4 is an enlarged vertical sectional view taken on e line 4—4 of FIG. 2.
Figure 5:
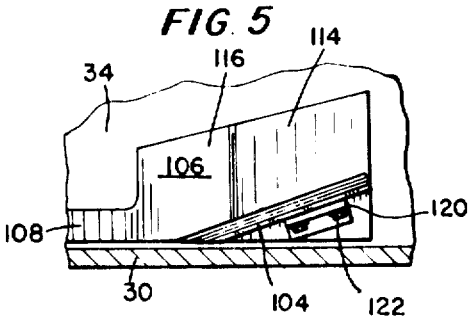
FIG. 5 is an enlarged vertical sectional view taken on e line 5—5 of FIG. 2.
Figure 6:
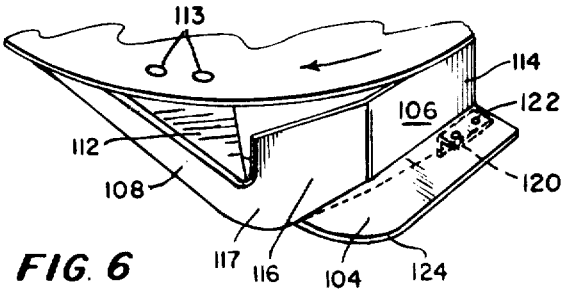
FIG. 6 is a fragmentary perspective view looking dially inwardly toward the hub and in the vicinity of e of the plow constructions.

Still referring to FIGS. 2 to 6, inclusive, the plow constructions 16, as heretofore mentioned, constitute the principal novelty of the present invention and each plow construction is comprised of three functional components including a main lift plow 104 of inclined scooplike design, a side wing 106 which extends generally upwardly from the inner edge of the lift plow 104, and a side plow *108* which projects a considerable distance beyond the lift plow in the leading direction of movement thereof. [These] *The* side plows 108 assume generally tangential positions with respect to the hub 12 and the inner ends thereof bear against an annular rib 110 (see FIG. 3) which depends from and is concentrically positioned with respect to the underneath side of the hub. *As illustrated in FIGS. 2 and 3, the plow constructions 16 are disposed outwards of the hub 12.* A relatively heavy gauge, horizontally extending mounting plate 112 is welded to the central portion of the upper margin of each side plow 108 and is connected by bolts 113 to the adjacent portion of the peripheral region of the hub on the underneath side thereof. Each side wing 106 is in the form of an angular plate having a planar trailing section 114 (see FIG. 6) which is substantially normal to a radius of the hub, and a planar leading section 116 which is inclined inwardly at an obtuse angle with respect to the leading edge of the trailing section 114, and is slightly inclined inwardly and upwardly with respect to the bottom wall 30 of the bowl 10. The outer end regions 117 of the side plows 108 merge gradually into and are connected to the front lower corner portions of the leading sections 116 of the side wings 106 as clearly shown in FIG. 3. *Each mulling plow construction 16 including the side plow 108 is thus disposed or arranged below the level of the hub 12, although parts of it, as best shown in FIGS. 3 and 5 of the drawings, extend considerably higher than said side plow 108 which is located directly beneath the hub 12.*

As previously indicated, the [left] *lift* plows 104 are disposed in edge-to-edge relationship with respect to the side wings 106, the inner edges of the left plows engaging both sections 114 and 116 of the side wings. Angle pieces 120 (see FIG. 3) have horizontal portions bolted as at 122 to the underneath sides of the [left] *lift* plows 104 and vertical portions bolted to the lower edge region of the trailing sections 114 of the side wings 106, thus reinforcing the side wings and [left] *lift* plows with respect to each other *and maintaining them in rigid relation.*

The specific function of the plow constructions 16 will be described in detail presently, the mode of operation thereof being largely a result of the shape of the lift plows 104, the side wings 106, and the side plows 108 and their positional relationship or orientation with respect to one another and to the bottom wall 30 and ıe sidewall 32 of the mulling bowl 10. For the present, is deemed sufficient to state that the [left] *lift* ows 104 serve to elevate the sand within the bowl om the bottom wall 30 thereof and place the same in e path of movement of the side wings 106 so that the tter may, by a combined shearing and smearing ac- ɔn against the liner 34 of the bowl sidewall 32, exert fficient pressure on the sand as continuously to in- bit the formation of clay conglomerations or sand usters, as well as to break up such clusters as may be rmed before they reach large proportions.

As best illustrated in FIG. 5, each [left] *lift* plow 14 is of platelike construction and is disposed at an ıgle of approximately 20° with respect to the horizon- l plane of the bottom wall 30 of the mulling bowl 10. ıe forward edge of each [plowpan] *lift plow* 104 is ırved as indicated at 124 and lies close to the bowl ɔttom wall 30. Both sections 114 and 116 of each side ng 106 are disposed in respective planes which as- me relatively steep angles with respect to the bottom ıll 30 of the bowl, the trailing section 114 extending ɔrmal to a radius of the hub and the leading section .6 extending from the forward edge of the trailing ction 114 at an obtuse angle. [The upper edge of .ch side wing 106 may lie close to or in the horizontal ane of the lowest circular rim of the hub 12 as shown FIG. 6.] Each side plow 108 travels close to the ɔttom wall 30 of the bowl so as to exert a sweeping tion on the sand and force the same outwardly and to the path of its associated lift plow 104. As shown in G. 3, two diametrically opposite sweeper arms 126 ıve their inner ends welded to the aforementioned ınular rib 110 and extend tangentially with respect to ch rib so that they function in the same manner as the le plows 108 to sweep sand radially outwards of the ɔwl bottom.

in the operation of the form of mulling apparatus ıich is shown in FIGS. 1 to 6, inclusive, the mulling ɔwl 10 is charged through the open upper rim 36 of e sidewall 32 with a batch of molding sand to be ulled, mixed or conditioned and the prerequisite ıantity of bonding agent, utilizing any suitable charg- g means such as an overhead conveyor or by the nple expedient of batch dumping the sand and bond- g agent into the bowl. Thereafter, upon energization the electric motor M, the motor operates through e gear reduction device 22 to rotate the vertical drive aft 64, and thus, cause rotation of the hub 12 in the rection indicated by the arrows in FIGS. 2, 3 and 6. It .ll be understood, of course, that the air cylinder 58 .ll previously have been operated to swing the door 52 to a closed position across the door opening 50, thus tablishing for the bowl 10 a smooth, continuous cy- ıdrical inner side surface by reason of the meeting lges of the elastomeric liners 34 and 54.

As soon as rotation of the hub 12 has commenced, e air cylinder 28 will be operated to open the damper ' in order to admit air under pressure to the interior of e bowl 10 through the hollow base casting 24 and the ntral opening 40 in the bowl bottom wall 30. Simi- rly, at this time, and under the control of suitable .lve means (not shown), water at a predetermined te of flow is admitted to the bowl through the supply pe 20. A considerable amount of such water and air flung radially outwardly beneath the hub 12 by the tion of the sweeper arms 126, as well as the side ows 108.

During rotation of the hub 12, the [left] *lift* plows 104 sweep around the peripheral region of the bowl bottom wall 30 and encounter the sand which has been swept radially outwardly by the side plows 108 and into the path of movement of these [left] *lift* plows. The downwardly and forwardly inclined [left] *lift* plows elevate the sand into the annular area which exists between the side wings 106 and the rubber-lined sidewall 32 of the bowl 10. The inwardly and upwardly inclined leading sections 116 of the side wings, in combination with the bowl sidewall 32, establish, in effect, revolving funnel structures which crowd the sand into the narrower annular area or space between the trail sections [116] *114* and the sidewall 32 so that a smearing action on the sand takes place, the sidewall 32 constituting the smearing anvil and the side wings 106 constituting smearing spatulas, so to speak. In this manner, the formation of sand or clay clusters is inhibited and any such clusters as may have an opportunity initially to take form are immediately broken up and uniformly dispersed. Additionally, pressure is exerted upon the sand thereby enhancing the desired coating action as a result of pressure extrusion of the sand. The net result of this smearing *or mulling* action is that the sand aggregate develops higher strength as it rises and recycles from one plow construction to the other. *From the drawings, especially FIGS. 3, 5 and 6, it is to be seen that both the trailing sections 114 and the leading sections 116 of the side wings 106 of the plow constructions 16 are of substantial height so as to accomplish the particular functions heretofore mentioned. Also from the drawings, it is to be seen that the trailing section 114 of each plow construction 16 is, above the associated lift plow 104, of substantially uniform sand-confining height from end to end.*

It is to be understood that in the exemplary form of plow construction illustrated herein, the particular weldments and bolting arrangements which have been resorted to constitute only one way in which the plow construction 16 may be caused to present the three major cooperating sand-impelling of sand-restraining surfaces outlined above, these surfaces consisting of the outer surface of the side plow 108 which throws the sand radially outwardly into the path of movement of the oncoming lift plow 104, the upper surface of such lift plow itself, and the outer surface of the side wing 106 which confines the sand on the lift plow and restrains it from sliding off the inner edge of such lift plow.

It is to be observed that the mulling wheels 14 (if employed) are disposed at an elevation above the elevation of the plow constructions 16. This elevated sand is trailed by the mulling wheels 14 which ride through the elevated sand and by reason of the free rotation of these wheels, the latter act to compact the sand against the rubber-lined sidewall 32 of the bowl 10 in the usual manner of operation of such mulling wheels.

When the mulling operation has been completed, the door 52 is swung open in the manner previously described and under the influence of the air cylinder 58. The parabolic hub 12 is maintained in operation and the flinging action of all of the parts that are associated therewith serves to throw the sand radially outwardly through the door opening 50 from whence it may be directed to and collected in a suitable receptacle.

The invention is not to be limited to the exact arrangement of parts shown in the accompanying drawings or described in this specification as various changes in the details of construction may be resorted to without departing from the spirit or scope of the invention.

Having thus described the invention what I claim as new and desire to secure by Letters Patent is:

1. In a mulling apparatus of the type that embodies a bowl adapted to receive therein a predetermined amount of granular material to be mulled and including a bottom wall and an upstanding cylindrical sidewall, a mulling assembly mounted for rotation in one direction about a vertical axis within the bowl and including a hub and a plurality of mulling plow constructions connected fixedly to and disposed outwards of the hub, arranged below the level of the hub and in circumferentially spaced relationship, and adapted for rotation bodily in unison with the hub, each plow construction including a platelike wing structure having an outer side face which opposes the inside face of the cylindrical wall of the bowl adjacent to the lower region of the latter, and having leading and trailing sections with respect to the direction of rotation of the mulling assembly, the leading section of said wing structure being inclined upwardly and inwardly with respect to the bowl bottom wall and being disposed for the most part at a greater distance from said sidewall than the trailing section to the end that it extends at an obtuse angle with respect to said trailing section, a side plow having its outer end connected to said leading section of the wing structure and its inner end fixedly secured to the hub, said side plow lying close to the bottom wall of the bowl and extending in a direction which is generally tangential with respect to the hub, whereby said side plow functions in the manner of a deflector for urging the granular material radially outwardly of the bowl and into the path of movement of the leading section of said wing structure, and means for rotating said mulling assembly in said one direction.

2. A mulling apparatus as set forth in claim 1 and including, additionally, a lift plow projecting radially outwardly from the lower edge portion of each wing structure, said lift plow being diposed between the wing structure and the sidewall of the bowl, being inclined downwardly in the direction of movement of the associated plow construction, and having a leading edge positioned in close proximity to the bottom wall of the bowl to the end that the lift plow functions as a scoop for elevating the granular material encountered thereby.

3. A mulling apparatus as set forth in claim 2 and including, additionally, a series of mulling wheels eccentrically mounted on said hub above the level of the latter, there being one mulling wheel for each plow construction, each mulling wheel assuming a trailing position with respect to its associated plow construction and being in the form of a freely rotatable disklike member the periphery of which is designed for cooperation with the bowl sidewall during rotation of the hub for compacting the granular material which is elevated by the lift plow of its associated plow construction against said sidewall.

4. In a mulling apparatus of the type that embodies a bowl adapted to receive therein a predetermined amount of granular material to be mulled and including a bottom wall and an upstanding cylindrical sidewall, a mulling assembly mounted for rotation in one direction about a vertical axis within the bowl and including a hub and a mulling plow construction fixedly connected to and disposed outwards of the hub, arranged below the level of the hub, and adapted for rotation bodily with the hub, said plow construction including a [ platelike ] *plate-like* sand-scooping lift plow presenting an upper surface which is inclined downwardly and forwardly with respect to the direction of movement of the plow construction and having inner and outer side edges, said outer side edge being disposed in close proximity to said upstanding sidewall of the bowl, a [ platelike ] *plate-like* wing structure having an outer side face which opposes the inner face of the cylindrical wall of the bowl adjacent to the lower region of the latter, and embodying leading and trailing sections with respect ot the direction of rotation of the mulling assembly, the trailing section extending upwards from the rear region of the inner edge of the lift plow, the leading section of said wing structure extending upwards from the front region of the inner portion of the [ left ] *lift* plow, being inclined upwardly and inwardly with respect to the bowl bottom, and being disposed for the most part at a greater distance from said sidewall than the trailing section to the end that it extends at an obtuse angle with respect to said training section, a side plow having its outer end connected to the front portion of said leading section of the wing structure and its inner end fixedly secured to the hub, said side plow lying close to the botton wall of the bowl and extending in a direction which is generally tangential with respect to the hub, whereby the side plow functions in the manner of a deflector for urging the granular material radially outwardly of the bowl and into the path of movement of the leading section of said wing structure, and means for rotating said mulling assembly in said one direction.

*5. In a mulling apparatus of the type that embodies a bowl adapted to receive therein a predetermined amount of molding sand to be mulled and including a bottom wall and an upstanding cylindrical side wall, a mulling assembly mounted for rotation in one direction about a vertical axis within the bowl and including a hub, and means for rotating said mulling assembly in said one direction, the improvement which comprises: a mulling plow construction provided with means whereby it is fixedly connected to the hub so that it is rotatable bodily with the hub and is disposed outwards and below the level of the hub, forming a part of the mulling assembly and including a plate-like, sand-scooping lift plow presenting an upper surface which is inclined downwardly and forwardly with respect to the direction of movement of the plow construction and has inner and outer side edges, said outer side edge being disposed in close proximity to said upstanding side wall of the bowl, a plate-like wing structure having an outer side face which opposes the inner face of the cylindrical wall of the bowl adjacent to the lower region of the latter, and embodying leading and trailing sections with respect to the direction of rotation of the mulling assembly, the trailing section extending upwards from the rear region of the inner edge of the lift plow, the leading section of said wing structure extending upwards from the front region of the inner portion of the lift plow, being inclined upwardly and inwardly with respect to the bowl bottom, and being disposed for the most part a greater distance from said side wall than the trailing section to the end that it extends at an obtuse angle with respect to said trailing section, a side plow having its outer end connected to the front portion of said leading section of the wing structure and its inner end fixedly secured to the hub through said connecting means, said side plow lying close to the bottom wall of the bowl and extending in a direction which is generally tangential*

*ith respect to the hub, whereby the side plow functions n the manner of a deflector for urging the sand radially utwardly of the bowl and into the path of movement of he leading section of said wing structure, said plow construction having its wing structure of such height that he leading section receives the deflected sand from the ide plow and deflects it with a funneling action into the pace between the trailing section of the wing structure nd the bowl side wall, and the trailing section confines ubstantially throughout its length and smears the sand etween it and the bowl side wall and thereby effects a significant mulling action.*

*6. The improvement in a mulling apparatus according to claim 5, in which the trailing section of the wing structure is of substantially uniform height from end to end.*

*7. The improvement in a mulling apparatus according to claim 5, in which the trailing portion of the wing structure is of substantially uniform height from end to end and is in rigid relation with the lift plow along the latter's rear portion of its inner edge.*

* * * * *